United States Patent
Ptak

(10) Patent No.: US 9,199,189 B1
(45) Date of Patent: Dec. 1, 2015

(54) FILTER MEDIUM HAVING OZONE AND ODOR REMOVAL PROPERTIES

(71) Applicant: Columbus Industries, Inc., Ashville, OH (US)

(72) Inventor: Thaddeus J. Ptak, Canal Winchester, OH (US)

(73) Assignee: Columbus Industries, Inc., Ashville, OH (US)

( * ) Notice: Subject to any disclaimer, the term of this patent is extended or adjusted under 35 U.S.C. 154(b) by 74 days.

(21) Appl. No.: 13/917,245

(22) Filed: Jun. 13, 2013

Related U.S. Application Data

(60) Provisional application No. 61/658,944, filed on Jun. 13, 2012.

(51) Int. Cl.
*B01D 53/02* (2006.01)
*B01D 53/04* (2006.01)

(52) U.S. Cl.
CPC .................. *B01D 53/0407* (2013.01)

(58) Field of Classification Search
CPC .................................................... B01D 53/0407
See application file for complete search history.

(56) References Cited

U.S. PATENT DOCUMENTS

| | | | |
|---|---|---|---|
| 3,513,643 A * | 5/1970 | Tarala | 55/473 |
| 4,495,030 A | 1/1985 | Giglia | |
| 4,565,727 A | 1/1986 | Giglia et al. | |
| 5,308,703 A * | 5/1994 | Tsujimoto et al. | 428/408 |
| 5,678,247 A | 10/1997 | Vickers | |
| 5,731,065 A * | 3/1998 | Stelzmuller et al. | 428/198 |
| 5,942,323 A | 8/1999 | England | |
| 6,024,782 A | 2/2000 | Freund et al. | |
| 6,030,698 A | 2/2000 | Burchell et al. | |
| 6,099,901 A | 8/2000 | Cronia et al. | |
| 6,302,946 B1 | 10/2001 | Cronia et al. | |
| 6,702,875 B2 | 3/2004 | Jagtoyen et al. | |
| 7,892,326 B2 | 2/2011 | Raetz et al. | |
| 2003/0089237 A1 * | 5/2003 | Jagtoyen et al. | 96/108 |
| 2004/0237790 A1 * | 12/2004 | von Blucher et al. | 96/154 |
| 2005/0067340 A1 * | 3/2005 | Broens et al. | 210/266 |
| 2006/0111007 A1 * | 5/2006 | Escaffre et al. | 442/414 |
| 2007/0095037 A1 * | 5/2007 | McLamb | 55/495 |
| 2010/0247404 A1 * | 9/2010 | Ptak et al. | 422/187 |
| 2011/0308524 A1 * | 12/2011 | Brey et al. | 128/205.12 |
| 2013/0193063 A1 * | 8/2013 | Ng et al. | 210/486 |

* cited by examiner

*Primary Examiner* — Christopher P Jones
(74) *Attorney, Agent, or Firm* — Jason H. Foster; Kremblas & Foster

(57) ABSTRACT

An ozone and odor removing filter media having a filtration layer and a supporting layer. The supporting layer includes activated carbon fibers or powders, or both, incorporated within the supporting layer. The activated carbon particles can be added to the supporting layer by combining them with binder in a slurry and extending the already-formed supporting layer through the slurry. The wetted layer then extends through opposed rollers to remove all but a desired amount of slurry. Alternatively, the activated carbon particles can be added to the mixture when forming the supporting layer.

26 Claims, 4 Drawing Sheets

FILTER MEDIUM HAVING OZONE AND ODOR REMOVAL PROPERTIES

CROSS-REFERENCES TO RELATED APPLICATIONS

This application claims the benefit of U.S. Provisional Application No. 61/658,944 filed Jun. 13, 2012, which is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The invention relates generally to a pleatable filter media for air filtration, and more particularly to a filter media with activated carbon components to convert ozone to $O_2$.

Filter media made of a filtration layer laminated to one or more support (also referred to as "backer") layers is used in conventional air filtration products, such as filters. The filtration layer can be a charged layer of fibers produced by the meltblown process. The backer layers consist of synthetic nonwoven fibers made in spunbond, dry laid or wet laid processes, and the backer layer can be made of glass fibers. Most backer layers provide little to no resistance to the flow of air due to the large size of the passages extending through the backer (also called "support" and "carrier") layer.

Filters made of this type of media are widely used in commercial and residential heating, ventilation and air conditioning (HVAC) systems, portable air cleaners, vacuums and other applications. Such conventional filters can remove particulate matter from the air stream forced through them, but they cannot remove ozone ($O_3$) and/or odors.

Ozone is identified, along with particulate matter and formaldehyde, as one of the major air pollutants of indoor air. All pollutants can have an adverse impact on the health of occupants of a dwelling, but ozone is a critical pollutant because it reacts with volatile organic compounds (VOC's) to create secondary particles that are 25-35 nanometers in size.

U.S. Pat. No. 6,099,901 and U.S. Pat. No. 6,302,946 describe methods of fabricating a filter medium capable of odor removal by adding sodium bicarbonate. The filter medium is saturated in a solution of sodium bicarbonate and binder and then dried. The filter material has a basis weight of 125 g/m² and load of sodium bicarbonate in the range of 2 g/m².

U.S. Pat. No. 6,024,782 describes a manufacturing process for making adsorptive material using activated carbon, zeolite, silica gel and other adsorbent particles. The manufacturing process consists of spraying adhesive onto a layer of adsorbent particles and forming a multilayered material. Particle diameters for the selected adsorbent are in the range of 0.05 to 3.0 mm, which makes these "coarse" particles.

U.S. Pat. No. 5,942,323 describes a process of making a filter with activated alumina, zeolite, sodium bicarbonate and other materials. The manufacturing process is based on the saturation of the fiber matrix with a water solution of selected substrate.

U.S. Pat. No. 5,942,323 describes a process of making a nonwoven activated carbon fabric with activated carbon fibers ranging from 10 to 75%. U.S. Pat. No. 5,678,247 describes a similar process for making odor-adsorbing clothing.

Other patents of possible relevance include U.S. Pat. No. 7,892,326; U.S. Pat. No. 4,565,727; U.S. Pat. No. 4,495,030; U.S. Pat. No. 6,702,875; and U.S. Pat. No. 6,030,698.

BRIEF SUMMARY OF THE INVENTION

The invention is a filter medium with high filtration efficiency to remove particulate matter and ozone. However, the filter medium does not have a significant increase in pressure drop across the filter relative to filters of similar, particle-entraining effectiveness that do not have ozone-removal characteristics. The invention accomplishes the advantages without significant disadvantages by uniformly covering the fibers of a carrier (support) layer with activated carbon particles in the form of granules and/or very short fibers.

The filter media of the present invention preferably has multilayer construction including at least a filtration (for example, a microfiber meltblown nonwoven) layer and a supporting layer having ozone and odor reduction properties and little resistance to air flow. The filtration layer material is preferably an electrostatically-charged meltblown polypropylene fiber material. The filtration and supporting layers can be laminated together with conventional adhesive or ultrasonic techniques. A conventional binder is used to bind the fibers of the supporting layer together. The binder can be vinyl acetate (latex), but this is not required. The invention contemplates a glass fiber supporting layer, but synthetic fibers can be used alternatively.

The ozone and, to some degree, odor removal properties of the supporting layer are achieved by coating the supporting layer with activated carbon particles, which can be granules, fibers or a mixture of activated carbon granules and activated carbon fibers. In some embodiments, activated carbon fibers may be added to glass or synthetic fibers of the supporting layer to serve the purpose of removing ozone by converting it to harmless $O_2$. In alternative embodiments, about 5 to about 50 percent of the glass or synthetic fibers that would typically be in a supporting layer may be left out during the manufacturing process and replaced with a similar quantity of activated carbon fibers.

In one method of making the supporting layer of the invention, activated carbon particles are mixed in a liquid binder with water and other chemicals to make the slurry. Then the already-formed supporting layer is passed through the slurry to coat the supporting layer. After this step, the supporting layer saturated in the liquid is squeezed between two rollers to remove some of the liquid and the activated carbon particles. This allows the manufacturer to control how much of the slurry remains as a percentage of the weight of the supporting layer's fibers (e.g., 40%). It is contemplated to leave about 20 to about 100% of the slurry on the supporting layer in this method, but the content is more preferably about 30% to about 60%.

A preferred activated carbon material is made of activated carbon particles with a CTC activity of no less than about 50%, but it is preferred to have an activity of up to about 80% or about 90% reactivity for the activated carbon particles. This equates to a Butane number of about no less than 20, and preferably up to about 31 to about 35. Add-ons include about 20 to about 100 percent of the base weight of the material. For example, for an add-on of 100 percent, one adds the same weight as the original supporting layer material in activated carbon particles and slurry binder to the original supporting layer material. The subsequent lamination of a conventional meltblown filtration layer to the backer is a standard process using adhesives and is not described herein in detail due to the fact that it is known to the person of ordinary skill.

It is contemplated to add to the supporting layer activated carbon fibers with or without the activated carbon granules. Activated carbon fibers can provide higher surface area than granules, and it is contemplated to add as little as about 5.0% fibers and up to as much as about 50% fibers to the activated carbon particle method described herein.

The filter medium is at least two layers thick with at least one melt blown filtration layer and at least one backer layer. The filter medium could be more than two layers thick. The filter medium is preferably pleated and is intended for use in home HVAC systems. Of course, the filter medium could be adapted to industrial or commercial systems by a person having ordinary skill.

Ozone decomposition to molecular oxygen by activated carbon is achieved by chemical interaction of ozone and carbon and by a catalytic route. A filter made with the preferred filtration medium removes some of the ozone in the air every time the air passes through the filter, so that with multiple passes a significant reduction in ozone content of the air is realized.

Figure 1:
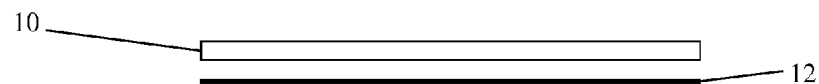
FIG. 1 is a schematic exploded view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

The preferred multilayer filter medium is shown in FIG. 1 having two layers, and two layers is the minimum number of layers contemplated. A first layer 10 is a filtration layer that performs the filtration function of the media, and is preferably made of an electrostatically charged web of fibers that are meltblown. The second layer 12 is a supporting layer that provides stiffness to the meltblown layer so that it can be pleated and will maintain the pleated configuration. The supporting layer 12 is preferably made of a nonwoven web of synthetic fibers or glass fibers and presents little to no resistance to the flow of air through the layer. The supporting layer 12 preferably contains activated carbon "particles", which is defined herein as including elongated activated carbon fibers, substantially spherical activated carbon granules or both, and it is the activated carbon of the supporting layer that distinguishes the media from the prior art and causes the filter media to reduce ozone in the air that is forced through the media.

The preferred filtration layer 10 is made of charged, polypropylene meltblown fibers made in a conventional meltblown process. Of course, the filtration layer can be made of other kinds of fibers, such as polypropylene spunbond, and other types of filtration layers such as nanofibers and perforated membranes, among others. The filtration layer can have a basis weight in the range of about 5.0 to about 50 $g/m^2$, and more preferably in the range of about 15 to about 35 $g/m^2$. The diameters of the meltblown fibers of the filtration layer are preferably in the range of about 1.0 to about 10 micrometers, and more preferably in the range of about 1.0 to about 5.0 micrometers. These fibers are preferably electrostatically charged using conventional techniques to enhance filtration efficiency.

One of the contemplated supporting layers includes coarse glass fibers and is made using a wet laid process. The glass fibers have a diameter in the range of about 12 to about 17 microns. This mat of coarse glass fibers is treated with a binder resin to achieve the desired strength and permeability. The basis weight of this layer can be in the range of about 20 to about 100 $g/m^2$, and more preferably 35 to 70 $g/m^2$.

Another possible supporting layer is a synthetic nonwoven web made of polyester, nylon, polypropylene or cellulose fibers, or a mixture of one or more of these types of fibers. Such a supporting layer can be wet laid, dry laid or spunbond and features a broad range of properties. It is contemplated for this application that the basis weight is generally in the range of about 10 to 90 $g/m^2$.

Figure 5:
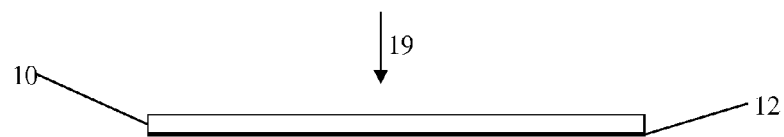
FIG. 5 is a schematic side view illustrating the embodiment of FIG. 1.

As shown in FIG. 5, the layers 10 and 12 are attached to one another in a face to face relationship. One face of one layer is preferably adhered or welded to the face of the other layer. Preferably, the face of one layer is adhered, welded or otherwise attached to the other layer contiguously across the width and length of the abutting faces. Then air can be forced in the direction of the arrows shown in FIGS. 5-9 through the filter media.

Figure 2:
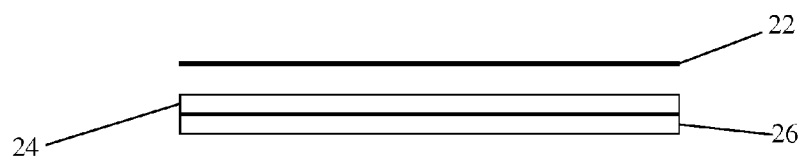
FIG. 2 is a schematic exploded view illustrating another embodiment of the present invention.
Figure 3:
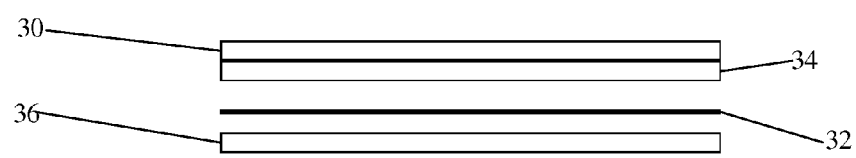
FIG. 3 is a schematic exploded view illustrating another embodiment of the present invention.
Figure 4:
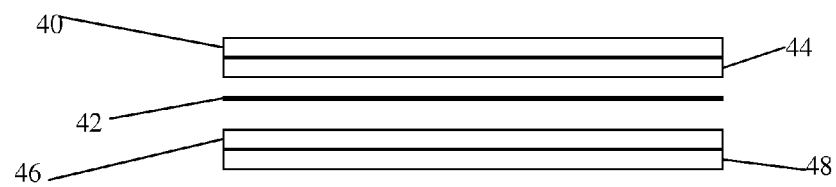
FIG. 4 is a schematic exploded view illustrating another embodiment of the present invention.
Figure 6:
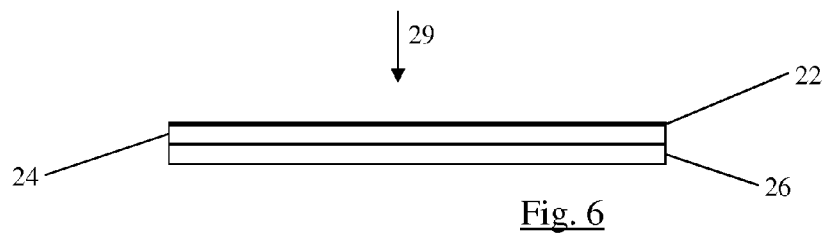
FIG. 6 is a schematic side view illustrating the embodiment of FIG. 2.
Figure 7:
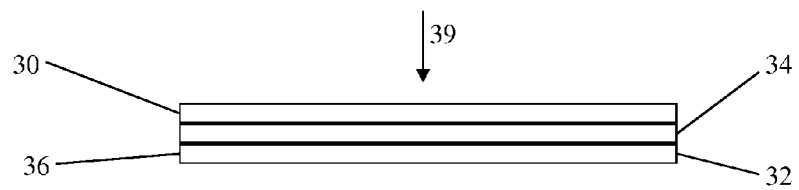
FIG. 7 is a schematic side view illustrating the embodiment of FIG. 3.
Figure 8:
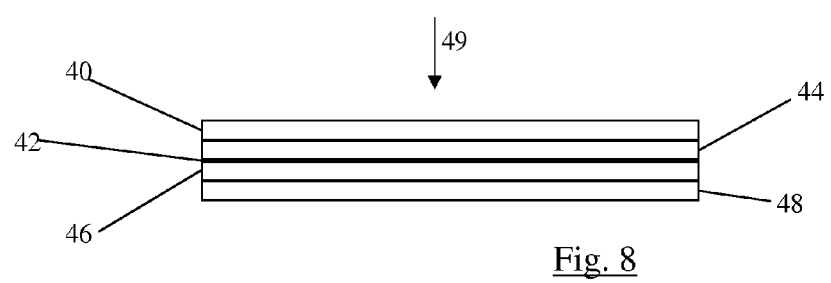
FIG. 8 is a schematic side view illustrating the embodiment of FIG. 4.
Figure 9:
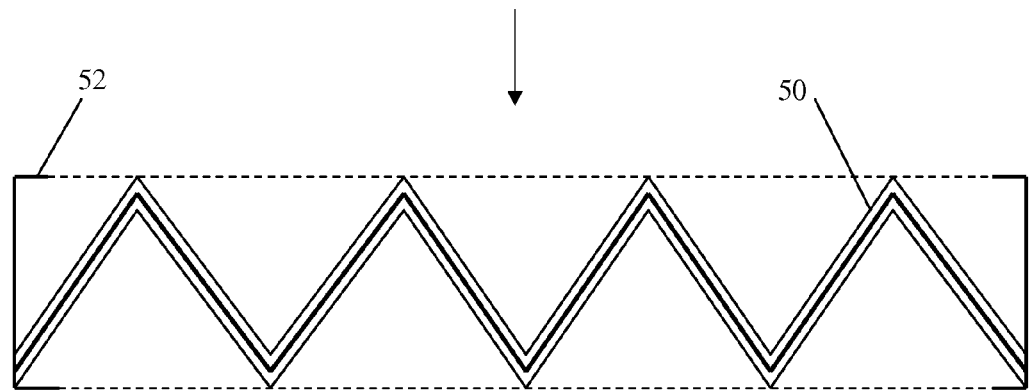
FIG. 9 is a schematic side view illustrating the embodiment of FIG. 1 in a pleated configuration.
Figure 10:
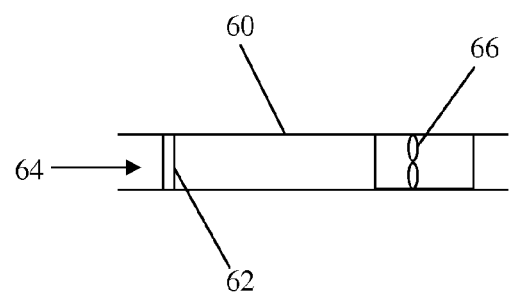
FIG. 10 is a schematic side view in section illustrating an embodiment of the inventive pleated filtration media in a frame.

As shown in FIG. 2, a supporting layer 22 can be attached to two filtration layers 24 and 26, each of which can be substantially identical, or which can differ by some characteristic, such as fiber size, pore size, charge (e.g., a filtration layer can be triboletric) or any other characteristic. As shown in FIGS. 3 and 4, a single supporting layer 32, 42, can support filtration layers 30, 34, 36 on one or both sides, or multiple filtration layers 40, 44, 46, 48 on opposing sides of the supporting layer. FIGS. 6, 7 and 8 show the filter media layers of FIGS. 2-4 in the face to face attached configuration to form filtration media. As shown in FIG. 9, a filtration media 50 made according to the invention can be pleated in a conventional manner and placed in a filter frame 52. As shown in FIG. 10, the resulting filter 62 can be mounted in ductwork 60 and a fan 66 can be actuated to draw air along the arrow 64 to force the air through the filter 62 made according to the invention.

There are at least two methods for adding the activated carbon particles to the supporting layer of the invention. The following are examples of the manufacturing processes in which the supporting layer has ozone-removal properties incorporated therein. Other methods will become apparent to the person of ordinary skill from the description herein.

Figure 11:
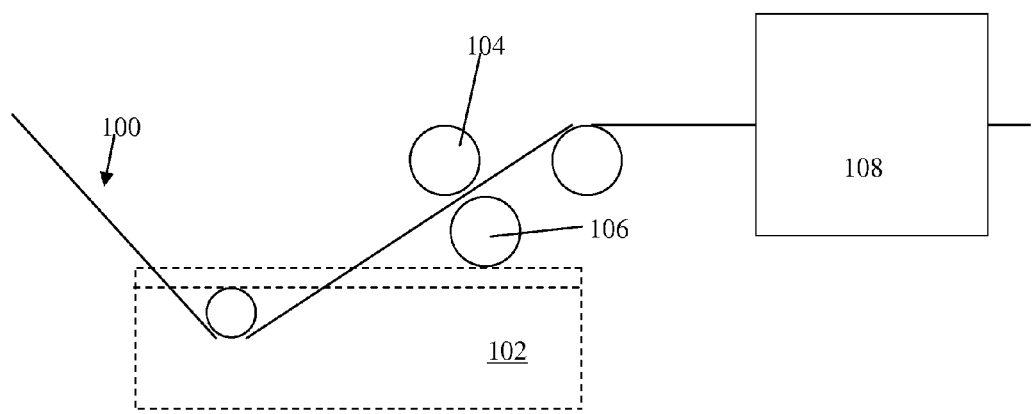
FIG. 11 is a schematic view illustrating an exemplary slurry coating system.
Figure 12:
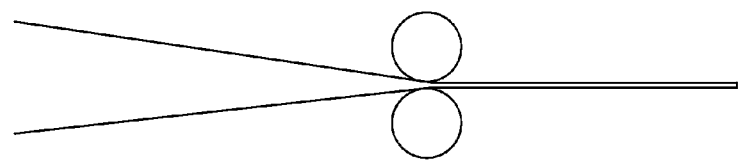
FIG. 12 is a schematic view illustrating an exemplary system for laminating the support layer to the filtration layer.

In a first example of incorporating the activated carbon into the supporting layer, an already-formed support layer 100 is passed through an activated carbon particle-containing slurry 102 to achieve a specified load of carbon on the support layer. This is illustrated in FIG. 11. In this example, activated carbon granules with an average particle size of about 20 to about 25 micrometers, activated carbon fibers having a length of about 1 to about 10 millimeters, preferably 1 to about 3 millimeters, and an average diameter of about 12 to about 17 micrometers, or both are mixed with a binder (such as acrylic emulsion) and other components to obtain a slurry 102 with desirable properties and viscosity. Next, the supporting layer mat 100 is passed through this slurry 102 to coat both sides of the supporting layer and infiltrate the interior with the slurry. The coated supporting layer can be passed between rollers 104 and 106 having substantially parallel axes and outer surfaces spaced apart a distance substantially equal to the thickness of the supporting layer to squeeze out all but a predefined quantity of the slurry. The coated supporting layer is next passed through an oven 108 at specific speed and temperature to fix the material in the supporting layer.

It is preferred to use shorter activated carbon fibers (about 0.5 to about 2.0 mm) when the activated carbon fibers are added to the binder system to bind with the already-formed supporting layer made of glass fibers during coating with the binder. It is preferred to add in the range of about 5.0% to about 50% activated carbon fibers to the binder mixture, with a preferred range of about 10 to about 30% activated carbon fibers. In this manner, the activated carbon particles (granules and/or fibers) are bound onto and within the mat of the supporting layer in quantities of about 20-100% added on, and more preferably 30-60% added on.

As an alternative to the above method, activated carbon can be incorporated into the matrix of the supporting layer when the supporting layer is formed, rather than coating an already-formed supporting layer. In this method, a quantity of activated carbon fibers is added to the mixture of glass or synthetic fibers prior to the glass or synthetic fibers being mixed and bonded together to form the supporting layer. It is preferred that the fiber mixture include fibers made of glass, poly(ethylene terephthalate) (PET) and other fibers, and the activated carbon fibers be added during the wet laid process of forming the supporting layer. Of course, activated carbon granules can be added on in this way, too.

In the above examples, activated carbon particles are provided in the form of powder (granules) with particle sizes in the range of about 10 to about 300 micrometers, and preferably with an average particle size in the range of about 30 to about 150 micrometers. The activated carbon particles in the form of fibers used in this process are preferably from about 5.0 to about 20 millimeters long, and more preferably about 5.0 to about 12 mm. Activated carbon fibers that are 1.0 to 3.0 mm are contemplated, as are fibers that are one-half inch long.

The activity of the preferred activated carbon powder and the preferred activated carbon fibers ranges from 20 to 35 butane activity and preferably 23 to 30 butane activity. The BET surface area of the activated carbon fibers is from about 800 to 1600 $m^2/g$.

The amount of activated carbon particles and binder added to a selected supporting layer depends on several factors, including the air permeability of the supporting layer, the target permeability of the final product with a coated supporting layer, the ozone removal performance, the stiffness and the cost. The amount of activated carbon added to a supporting layer (backer) can be defined using the following equation:

Add-on=100(coated backer weight−backer basis weight)/backer basis weight

For example, with a backer (supporting layer) basis weight of 45 $g/m^2$ and a weight of the coated backer of 65 $g/m^2$, the calculated add-on is 100(65−45)/45=44%. The add-on rate is preferably in the range of 20 to 100%, and more preferably 30 to 60% to assure pleatability of the final product. The amount of activated carbon fibers in the carbon slurry is in the range of 5.0 to 50% of the weight of the other fibers, preferably 10 to 30%. In this manner, the activated carbon fibers are incorporated into the matrix of the supporting layer along with the glass or synthetic fibers when the layer is formed. Other sorbents such as zeolite can be also used in this application if odor removal is desirable.

The proposed pleatable multilayer filter medium contains activated carbon in the form of powder (substantially spherical granules), fibers (substantially elongated) or both. The amount of added activated carbon granules and activated carbon fibers is relatively low, allowing the filter medium to be pleatable and thin. The resulting filter medium is self-supporting, has a broad range of filtration efficiencies for particulates, from about 50 to about 99.97% at 0.3 micron particle size, low pressure drop (approximately 10% higher than for a filter medium without treatment particles) and good ozone removal efficiency. As an example of the results of the ozone removal efficiency, filters were tested for single pass ozone removal efficiency at the ozone concentration C=50 ppb and air face velocity of 500 fpm as described below. For this situation, single pass ozone removal efficiency was E=43% for material with add-on of 50% and single pass ozone removal efficiency was E=50% for material with add-on of 70%.

Test Results

Examples

These examples are for illustrative purpose only and are not the only embodiments of the invention. The samples were tested according to the ASHRAE 145.2 standard which describes the test method to measure performance of full scale sorptive media type air cleaning filters. According to this standard, the performance of air filters is defined as "penetration", P, which is the fraction of a contaminant that passes through the air cleaner in a given time interval, where P=downstream concentration/average upstream concentration. The removal efficiency is defined as: E=100 (1−P). Ozone was used as a challenge gas.

Supporting layers with activated carbon were laminated to a layer of meltblown with a basis weight of approximately 25 $g/m^2$. This composite material was used to construct full-sized filters which were tested for ozone removal. Three different types of supporting layers containing activated carbon were made:

Sample 1—Supporting layer was coated with activated carbon granules at different levels of add-on.

Sample 2—Supporting layer was coated with a mixture of activated carbon granules and activated carbon fibers (ACF) at different levels of add-on.

Sample 3—Supporting layer was made with added activated carbon fibers during the manufacturing process.

Ozone removal efficiency was tested at the air face velocity of 492 fpm and ozone concentration of C=50 ppb (parts per billion).

| Sample | Efficiency [%] |
| --- | --- |
| Sample 1 – add-on = 50% | 43 |
| Sample 1 – add-on = 70% | 50 |
| Sample 2 – add-on = 50% (5% ACF) | 54 |
| Sample 3 – ACF = 20% | 10 |

U.S. Provisional Application No. 61/658,944 filed Jun. 13, 2012, which is the above claimed priority application, is incorporated in this application by reference.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A support layer in a filtration media, the support layer comprising:
   (a) fibers bound together to form a perforated support layer having a first face and an opposing, second face, the first face laminated to a face of a first filtration media layer, wherein the support layer has neither substantial filtration effect nor substantial resistance to fluid flow through the filtration media, and wherein the support layer is sufficiently rigid to support the first filtration media layer in a pleated configuration; and
   (b) activated carbon particles incorporated into the support layer.

2. The support layer in accordance with claim 1, wherein the carbon particles comprise activated carbon granules.

3. The support layer in accordance with claim 1, wherein the carbon particles comprise substantially elongated activated carbon fibers.

4. The support layer in accordance with claim 3, wherein the quantity of activated carbon fibers is in the range of 10 to 30% of the weight of the other fibers of the support layer.

5. The support layer in accordance with claim 4, wherein the activated carbon fibers have an average length of about 5.0 to about 20 millimeters.

6. A filtration media comprising:
   (a) a first filtration media layer having a first face and an opposing second face, wherein the first filtration media layer is made substantially of fibers;
   (b) a perforated support layer having a first face and an opposing second face, the first face laminated to the first face of the first filtration media layer, wherein the support layer has neither substantial filtration effect nor substantial resistance to fluid flow through the filtration media, and wherein the support layer is sufficiently rigid to support the first filtration media layer in a pleated configuration; and
   (c) activated carbon particles incorporated into the support layer.

7. The support layer in accordance with claim 6, wherein the carbon particles comprise activated carbon granules.

8. The support layer in accordance with claim 6, wherein the carbon particles comprise substantially elongated activated carbon fibers.

9. The support layer in accordance with claim 8, wherein the quantity of activated carbon fibers is in the range of 10 to 30% of the weight of the other fibers of the support layer.

10. The support layer in accordance with claim 9, wherein the activated carbon fibers have an average length of about 5.0 to about 20 millimeters.

11. A filter having a frame mounted in an enclosed air path through which air is forced, the filter comprising:
   (a) a first filtration media layer having a first face and an opposing second face, wherein the first filtration media layer is made substantially of fibers;
   (b) a perforated support layer having a first face and an opposing second face, the first face laminated to the first face of the first filtration media layer, wherein the support layer has neither substantial filtration effect nor substantial resistance to fluid flow through the filtration media, and wherein the support layer supports the first filtration media layer in a pleated configuration; and
   (c) activated carbon particles incorporated into the support layer.

12. The support layer in accordance with claim 11, wherein the carbon particles comprise activated carbon granules.

13. The support layer in accordance with claim 11, wherein the carbon particles comprise substantially elongated activated carbon fibers.

14. The support layer in accordance with claim 13, wherein the quantity of activated carbon fibers is in the range of 10 to 30% of the weight of the other fibers of the support layer.

15. The support layer in accordance with claim 14, wherein the activated carbon fibers have an average length of about 5.0 to about 20 millimeters.

16. A method of making a support layer in a filtration media, the method comprising:
   (a) binding support layer fibers together to form a perforated support layer having a first face and an opposing, second face, wherein the support layer has neither substantial filtration effect nor substantial resistance to fluid flow through the filtration media;
   (b) incorporating activated carbon particles into the support layer; and
   (c) laminating the first face to a face of a filtration media layer;
   wherein the support layer is sufficiently rigid to support the filtration media layer in a pleated configuration.

17. The method in accordance with claim 16, wherein the step of mounting activated carbon particles further comprises:
   (a) extending the support layer through a slurry of binder and activated carbon particles;
   (b) extending the support layer through a pair of opposing rollers mounted on substantially parallel axes and having outer surfaces spaced from one another substantially the same distance as a support layer thickness; and then
   (c) exposing the support layer to an elevated temperature to fix any remaining slurry material.

18. The method in accordance with claim 17, wherein the carbon particles comprise activated carbon granules.

19. The method in accordance with claim 17, wherein the carbon particles comprise substantially elongated activated carbon fibers.

20. The method in accordance with claim 19, wherein the quantity of activated carbon fibers is in the range of 10 to 30% of the weight of the other fibers of the support layer.

21. The method in accordance with claim 20, wherein the activated carbon fibers have an average length of about 5.0 to about 20 millimeters.

22. The method in accordance with claim 16, wherein the step of mounting activated carbon particles further comprises:
   (a) placing the particles in a mixture of the support layer fibers and binder prior to formation of the perforated, rigid support layer; and
   (b) mixing the mixture until the particles are mixed well with the support layer fibers.

23. The method in accordance with claim 22, wherein the carbon particles comprise activated carbon granules.

24. The method in accordance with claim 22, wherein the carbon particles comprise substantially elongated activated carbon fibers.

25. The method in accordance with claim 24, wherein the quantity of activated carbon fibers is in the range of 10 to 30% of the weight of the other fibers of the support layer.

26. The method in accordance with claim 25, wherein the activated carbon fibers have an average length of about 5.0 to about 20 millimeters.

* * * * *